United States Patent
Matsumoto

(10) Patent No.: US 11,634,135 B2
(45) Date of Patent: Apr. 25, 2023

(54) DRIVING SUPPORT CONTROL DEVICE FOR VEHICLE

(71) Applicant: TOYOTA JIDOSHA KABUSHIKI KAISHA, Toyota (JP)

(72) Inventor: Harue Matsumoto, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 84 days.

(21) Appl. No.: 17/231,480

(22) Filed: Apr. 15, 2021

(65) Prior Publication Data

US 2022/0032908 A1 Feb. 3, 2022

(30) Foreign Application Priority Data

Aug. 3, 2020 (JP) .............................. JP2020-131783

(51) Int. Cl.
  *B60W 30/16* (2020.01)
  *B60W 30/165* (2020.01)
  *B60W 30/18* (2012.01)

(52) U.S. Cl.
  CPC .... *B60W 30/165* (2013.01); *B60W 30/18163* (2013.01); *B60W 2554/4042* (2020.02)

(58) Field of Classification Search
  CPC ......... B60W 30/165; B60W 30/18163; B60W 2554/4042; B60W 2540/10; B60W 2540/18; B60W 30/16; B60W 2520/28; B60W 2554/4026; B60W 2554/802; B60W 30/10; B60W 30/08; B60W 30/00; B60W 50/0097; B60W 50/0098; B60W 50/06; B60W 50/08; B60W 60/00274; G05D 2201/0213; G06V 20/58; G06V 20/52; G06V 20/54; G06V 20/588
  USPC ........................................................ 701/96
  See application file for complete search history.

(56) References Cited

U.S. PATENT DOCUMENTS

| | | | |
|---|---|---|---|
| 10,562,532 B2 | 2/2020 | Hashimoto et al. |
| 10,759,419 B2 | 9/2020 | Kindo et al. |
| 10,858,007 B2 | 12/2020 | Hashimoto et al. |
| 11,001,263 B2 | 5/2021 | Shimizu et al. |
| 11,043,127 B2 | 6/2021 | Sakaguchi |
| 11,072,334 B2 | 7/2021 | Aoki et al. |

(Continued)

FOREIGN PATENT DOCUMENTS

| JP | 2004-189101 A | 7/2004 |
| JP | 2004-265238 A | 9/2004 |

(Continued)

*Primary Examiner* — Harry Y Oh
*Assistant Examiner* — Hossam M Abd El Latif
(74) *Attorney, Agent, or Firm* — Sughrue Mion, PLLC

(57) ABSTRACT

A device of the present disclosure controls a vehicle speed of a vehicle such that the vehicle speed matches a set vehicle speed when a preceding vehicle is not detected, and controls the vehicle speed of the vehicle such that the vehicle follows the preceding vehicle when the preceding vehicle is detected. The device controls the vehicle speed of the vehicle assuming that the preceding vehicle is not detected, when a condition that allows the vehicle to overtake the two-wheeled vehicle is satisfied and an intention of a driver to overtake a two-wheeled vehicle is detected, in a case where the two-wheeled vehicle is detected as the preceding vehicle and the vehicle speed is controlled such that the vehicle follows the two-wheeled vehicle.

7 Claims, 4 Drawing Sheets

(56) References Cited

U.S. PATENT DOCUMENTS

| | | |
|---|---|---|
| 11,173,909 B2 | 11/2021 | Akatsuka |
| 11,180,132 B2 | 11/2021 | Nakayama et al. |
| 11,192,555 B2 | 12/2021 | Hashimoto et al. |
| 11,208,107 B2 | 12/2021 | Urano et al. |
| 11,232,705 B2 | 1/2022 | Yang et al. |
| 11,279,360 B2 | 3/2022 | Fukuda et al. |
| 2004/0176900 A1 | 9/2004 | Yajima |
| 2015/0360684 A1* | 12/2015 | Matsuno ......... B60W 30/18163 701/23 |
| 2018/0001764 A1* | 1/2018 | Bang .................... B60W 30/16 |
| 2019/0232960 A1* | 8/2019 | Yokota ................. B60W 30/16 |
| 2019/0256162 A1* | 8/2019 | Denholm ............... G06V 20/56 |
| 2019/0315355 A1* | 10/2019 | Tokimasa .............. B60W 30/16 |
| 2020/0189588 A1 | 6/2020 | Aoki ..................... B60W 30/12 |
| 2021/0046936 A1* | 2/2021 | Umeda ................. B60W 10/20 |
| 2022/0080969 A1* | 3/2022 | Fischer ................. B60W 40/08 |

FOREIGN PATENT DOCUMENTS

| | | | |
|---|---|---|---|
| JP | 2005-149402 A | 6/2005 | |
| JP | 2006-038697 A | 2/2006 | |
| JP | WO2014/162941 A1 | 2/2017 | |
| JP | 2018-094943 A | 6/2018 | |
| WO | 2018/211645 A1 | 11/2018 | |
| WO | 2019/171576 A1 | 9/2019 | |

* cited by examiner

DRIVING SUPPORT CONTROL DEVICE FOR VEHICLE

CROSS-REFERENCE TO RELATED APPLICATION

This application claims priority to Japanese Patent Application No. 2020-131783 filed on Aug. 3, 2020, incorporated herein by reference in its entirety.

BACKGROUND

1. Technical Field

The present disclosure relates to a device for supporting driving of a vehicle such as an automobile, and more particularly relates to a driving support control device that executes adaptive cruise control (ACC).

2. Description of Related Art

As a driving support system for a vehicle, a configuration called "ACC" has been proposed and put into practice in various modes. The ACC basically executes constant speed traveling control of automatically controlling a vehicle speed to a value set by a driver. When there is a preceding vehicle, in particular, the ACC executes distance control or follow-up control of following the preceding vehicle while detecting the preceding vehicle with a detection unit such as a radar or a camera and securing an appropriate distance from the preceding vehicle. For the technology related to the ACC, it has been proposed that control is executed in different modes between a case where the preceding vehicle is a four-wheeled vehicle and a case where the preceding vehicle is a two-wheeled vehicle because the behavior of the preceding vehicle differ. For example, WO 2018/211645 proposes that both the distance control and the follow-up control with respect to the four-wheeled vehicle are executed when the preceding vehicle is a four-wheeled vehicle, but when the preceding vehicle is a two-wheeled vehicle, the distance control with respect to the two-wheeled vehicle is executed without execution of the follow-up of the two-wheeled vehicle. This is because two-wheeled vehicles have a larger amount of lateral movement than four-wheeled vehicles. If the follow-up control is executed with respect to the two-wheeled vehicle, the behavior of the own vehicle becomes unstable due to lateral movement and the behavior of the own vehicle may be largely disturbed. Japanese Unexamined Patent Application Publication No. 2004-265238 (JP 2004-265238 A) also describes a situation in which a two-wheeled vehicle is a vehicle to be followed and a vehicle ahead of the two-wheeled vehicle is detected. JP 2004-265238 A proposes that in this situation, when the two-wheeled vehicle attempts to overtake the vehicle ahead of the two-wheeled vehicle, acceleration of the own vehicle is suppressed despite that the two-wheeled vehicle to be followed accelerates, in order to restrain the own vehicle from becoming too close to the vehicle ahead of the two-wheeled vehicle. Further, Japanese Unexamined Patent Application Publication No. 2006-38697 (JP 2006-38697 A) proposes determining whether another vehicle is a four-wheeled vehicle or a two-wheeled vehicle based on the intensity pattern of reflected wave of the irradiation wave emitted from the own vehicle, and when the preceding vehicle to be followed is a two-wheeled vehicle, setting a set distance from the preceding vehicle to be longer than in the case of the four wheel vehicle.

SUMMARY

By the way, two-wheeled vehicles such as motorcycles and bicycles are smaller in width than four-wheel vehicles, so they are easier to overtake, and the vehicle speed of two-wheeled vehicles is often slower than that of four-wheeled vehicles. When traveling following a two-wheeled vehicle, therefore, the driver of the four-wheeled vehicle behind the two-wheeled vehicle more frequently overtakes the two-wheeled vehicle ahead compared with the case where the preceding vehicle is a four-wheeled vehicle, with an intention of more smooth traveling. Similarly, when the four-wheeled vehicle is following the two-wheeled vehicle with the operation of the ACC and a traveling situation is secured in which the four-wheeled vehicle can safely overtake the two-wheeled vehicle, a more comfortable traveling state is provided for the driver of the vehicle behind (four-wheeled vehicle) if overtaking is allowed under the operation of the ACC. That is, a case is assumed that the ACC is activated in the vehicle and the vehicle is following the two-wheeled vehicle serving as the preceding vehicle. In this case, it is considered that suitable driving support that reduces the operational burden on the driver can be provided, when a configuration is provided in which the vehicle can overtake the two-wheeled vehicle without any driver's operation for acceleration with the activation of the ACC, with the conditions that allow overtaking of the two-wheeled vehicle satisfied in the traveling situation and with a request made by the driver.

Thus, one issue of the present disclosure is to improve the configuration of control such that, in the driving support control device for a four-wheeled vehicle that executes the ACC, when the distance control or the follow-up control is executed so as to follow the two-wheeled vehicle as the preceding vehicle and a traveling situation that allows overtaking of the two-wheeled vehicle is established, the vehicle can overtake the two-wheeled vehicle without the acceleration operation by the driver, based on the driver's intention of overtaking.

According to the present disclosure, the above issue is achieved by a driving support control device for a vehicle having four wheels. The driving support control device includes: a preceding vehicle detection unit that detects a preceding vehicle in a path of the vehicle, the preceding vehicle detection unit being configured to determine whether the preceding vehicle is a four-wheeled vehicle or a two-wheeled vehicle; and a vehicle speed control unit that controls a vehicle speed of the vehicle such that the vehicle speed matches a set vehicle speed when the preceding vehicle is not detected, and controls the vehicle speed of the vehicle such that the vehicle follows the preceding vehicle when the preceding vehicle is detected, the vehicle speed control unit being configured to control the vehicle speed of the vehicle assuming that the preceding vehicle is not detected when a condition that allows the vehicle to overtake a two-wheeled vehicle is satisfied and an intention of a driver to overtake the two-wheeled vehicle is detected, in a case where the two-wheeled vehicle is detected as the preceding vehicle and the vehicle speed of the vehicle is controlled such that the vehicle follows the two-wheeled vehicle.

In the above configuration, the "set vehicle speed" may be set by the driver. A set vehicle speed acquisition unit may be provided that acquires the set vehicle speed so as to refer to a value of the set vehicle speed that is set by the driver to a desired vehicle speed in an appropriate mode. The "preceding vehicle detection unit" is a unit that can detect, by an appropriate method, presence/absence of a preceding vehicle on the path of the vehicle, that is, a preceding vehicle traveling on the road ahead of the vehicle in the traveling direction and the distance between the vehicle and the preceding vehicle, based on information obtained by any sensor device that can detect the presence and the positions of objects around the vehicle, such as a millimeter-wave radar, a lidar, and camera. Further, the preceding vehicle detection unit may be a unit capable of determining whether the preceding vehicle is a four-wheeled vehicle or a two-wheeled vehicle from an image of the preceding vehicle or the like. The "vehicle speed control unit" in the above device basically is a configuration of the ACC, that is, a configuration that controls the vehicle speed of the vehicle such that the vehicle speed of the vehicle matches the set vehicle speed when the preceding vehicle is not detected and controls the vehicle speed of the vehicle such that the vehicle follows the preceding vehicle when the preceding vehicle is detected. In the vehicle speed control unit, typically, the control for following the detected preceding vehicle may be configured such that, when the vehicle speed of the preceding vehicle is lower than the set vehicle speed, the vehicle speed is controlled so that the vehicle travels rearward of the preceding vehicle at the same vehicle speed as the preceding vehicle while securing the distance that is appropriately set. Thus, when the vehicle speed of the preceding vehicle is higher than the set vehicle speed, the vehicle speed of the vehicle is controlled so as to match the set vehicle speed. In addition, when the preceding vehicle is detected and the vehicle speed of the vehicle (own vehicle) is higher than the vehicle speed of the preceding vehicle, the vehicle speed of the vehicle (own vehicle) is decreased so as to match the vehicle speed of the preceding vehicle in order to maintain the above distance.

Then, in the above device of the present embodiment, the vehicle speed control unit controls the vehicle speed of the vehicle assuming that the preceding vehicle is not detected, when the condition that allows the vehicle to overtake the two-wheeled vehicle and an intention of the driver to overtake the two-wheeled vehicle is detected, in the case where the two-wheeled vehicle is detected as the preceding vehicle and the vehicle speed is controlled such that the vehicle follows the two-wheeled vehicle. That is, in the device of the present embodiment, in the case where the preceding vehicle is a two-wheeled vehicle, the control for following the two-wheeled vehicle serving as the preceding vehicle is terminated when the condition that allows the vehicle to overtake the two-wheeled vehicle is satisfied and the driver intends to overtake the two-wheeled vehicle, even in a state in which the two-wheeled vehicle is detected as the preceding vehicle. In other words, in the present embodiment, when the preceding vehicle is a two-wheeled vehicle, the control for following the preceding vehicle is more likely to be canceled than in the case of a four-wheeled vehicle. According to such a configuration, under the operation of the ACC, the vehicle speed is normally controlled such that the vehicle follows the preceding vehicle as long as the preceding vehicle is detected. When the preceding vehicle is a two-wheeled vehicle, a situation in which overtaking of the two-wheeled vehicle is possible is established, and the driver indicates the intention of overtaking, the vehicle speed is controlled such that the vehicle overtakes the two-wheeled vehicle similarly to the case where the driver drives by themselves. Thus, the driving support that gives the driver a comfortable driving state can be obtained.

In the above configuration, the "condition that allows the vehicle to overtake the two-wheeled vehicle" is simply a condition under which the overtaking of the two-wheeled vehicle can be safely achieved, and may be substantially the same as the condition that should be confirmed when the driver themselves performing the overtaking of the two-wheeled vehicle. The condition can be confirmed with any sensor device that can detect the presence and the positions of the objects around the vehicle, such as a millimeter-wave radar, a lidar, and a camera used for the preceding vehicle detection unit, and any recognition unit that recognizes the objects around the vehicle based on information obtained by the sensor device. In the embodiment, such "condition that allows the vehicle to overtake the two-wheeled vehicle" may be appropriately set by those skilled in the art at the time of designing, manufacturing, or adjusting the device of the present embodiment.

More specifically, the above "condition that allows the vehicle to overtake the two-wheeled vehicle" may include that it is determined that the vehicle can travel on the side of the two-wheeled vehicle without a possibility of contacting the two-wheeled vehicle. Such a condition is, in brief, a condition under which the vehicle can pass by on the side of the two-wheeled vehicle without contacting the two-wheeled vehicle, and represents that none of the states that may interfere with the vehicle passing by on the side of the two-wheeled vehicle has occurred, as specifically described in the section of the embodiments below.

In addition, the above "condition that allows the vehicle to overtake the two-wheeled vehicle" may include that the vehicle speed of the two-wheeled vehicle is a speed at which the vehicle can overtake the two-wheeled vehicle at a vehicle speed equal to or lower than the set vehicle speed. In the device of the present embodiment, the vehicle overtakes the two-wheeled vehicle under the operation of the ACC. Therefore, the "condition that allows the vehicle to overtake the two-wheeled vehicle" may include that the vehicle can overtake the two-wheeled vehicle at the set speed in the ACC. Specifically, the condition may include that a difference obtained by subtracting the vehicle speed of the two-wheeled vehicle from the set vehicle speed exceeds a predetermined value (the predetermined value may be set by calibration).

Further, the "condition that allows the vehicle to overtake the two-wheeled vehicle" may include that there is no other vehicle or obstacle having a possibility of contacting the vehicle while the vehicle is traveling on the side of the two-wheeled vehicle. That is, the condition includes that, while the vehicle is traveling rearward of the two-wheeled vehicle, another vehicle or obstacle that is present or may be present in the adjacent lane that the vehicle will pass when overtaking the two-wheeled vehicle is not detected.

Furthermore, in the device of the present embodiment described above, a further-preceding vehicle detection unit may be provided that detects a further-preceding vehicle on the path of the vehicle, and the "condition that allows the vehicle to overtake the two-wheeled vehicle" may include that the vehicle is determined to have no possibility of contacting the further-preceding vehicle after overtaking the two-wheeled vehicle. Here, the further-preceding vehicle is a vehicle traveling ahead of the two-wheeled vehicle. That is, safer driving support can be provided by detecting not only the preceding vehicle but also the further-preceding vehicle and confirming that the vehicle has no possibility of contacting the preceding vehicle and the further-preceding vehicle after overtaking the two-wheeled vehicle.

In the above device of the present embodiment, the actual operation of overtaking the two-wheeled vehicle by the vehicle is performed in response to the intention of the driver of the vehicle as described above. The driver's intention may be detected in any mode. For example, it may be determined that there is a driver's intention of overtaking when the driver performs a predetermined operation that may be appropriately set for the accelerator pedal or the steering wheel, e.g., operation usually performed at the time of overtaking. In the device of the present embodiment, steering when overtaking a two-wheeled vehicle may be performed by the steering wheel operation of the driver or based on the steering wheel operation.

Further, in the above device of the present embodiment, the vehicle speed control unit may be configured to control the vehicle speed of the vehicle to the set vehicle speed when the condition that allows the vehicle to overtake the two-wheeled vehicle is satisfied and the intention of the driver to overtake the two-wheeled vehicle is detected while the vehicle speed control unit is controlling the vehicle speed of the vehicle such that the vehicle follows the two-wheeled vehicle. Thereby, while the vehicle is overtaking the two-wheeled vehicle, the driver does not perform the operation for accelerating the vehicle and the vehicle speed is automatically controlled to the set vehicle speed desired by the driver, so that the driving support that reduces the operational burden on the driver can be provided. It should be noted that the magnitude of the acceleration during overtaking of the two-wheeled vehicle may be adjusted to a magnitude different from that during the constant speed traveling control when the preceding vehicle is not detected, in order to provide the safe traveling of the vehicle.

Thus, in the above device of the present embodiment, in the driving support control device for a vehicle that executes the ACC, when the state is established in which the vehicle can overtake the two-wheeled vehicle during the execution of the distance control or the follow-up control for following the two-wheeled vehicle serving as the preceding vehicle, the control for following the two-wheeled vehicle is ended on a precondition of responding the driver's intention and the vehicle speed is automatically controlled such that the vehicle overtakes the two-wheeled vehicle. Thereby, when the vehicle speed of the preceding two-wheeled vehicle is low during the operation of the ACC, the vehicle can safely overtake the two-wheeled vehicle while receiving the vehicle speed control by the ACC, so that suitable driving support that follows the driver's intention is provided.

Other objects and advantages of the present disclosure will be apparent from the following description of preferred embodiments of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Configuration of Vehicle

Figure 1A:
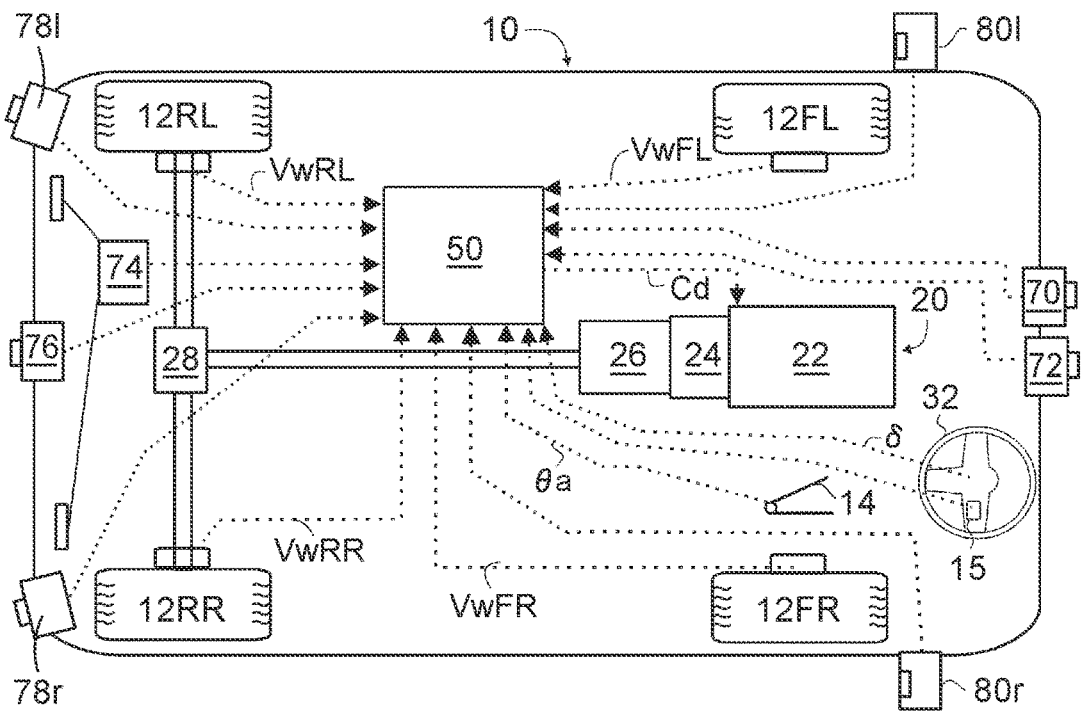
FIG. 1A is a schematic view of a vehicle equipped with one of preferred modes of a driving support control device for a vehicle according to a present embodiment.

With reference to FIG. 1A, a vehicle 10 such as an automobile in which one of preferred modes of a driving support control device of the present embodiment is incorporated includes, in a normal mode, right and left front wheels 12FR and 12FL, right and left rear wheels 12RR and 12RL, a drive device 20 that generates a driving force on each wheel (in the example shown in FIG. 1A, only on the rear wheels because the vehicle is a rear wheel drive vehicle), and a steering device for controlling steered angles of the wheels (only a steering wheel 32 is shown), and a brake device (not shown) for generating a braking force on each wheel. The drive device 20 is configured such that, in the normal mode, in response to depression of an accelerator pedal 14 by a driver, a driving torque or a rotational force is transmitted from an engine and/or an electric motor 22 (a hybrid drive device having both an engine and an electric motor may be used) to the rear wheels 12RL and 12RR via a torque converter 24, a transmission 26, a differential gear device 28, and the like. The steering device may employ a power steering device that transmits rotation of the steering wheel 32 operated by the driver to tie rods (not shown) while boosting the rotational torque, to steer the front wheels 12FL and 12FR. The brake device may be of any type that applies a braking force to each wheel in response to the depression of the brake pedal (not shown) by the driver.

Further, the vehicle 10 equipped with the driving support control device of the present embodiment may include, in order to detect a preceding vehicle and determining whether the preceding vehicle is a two-wheeled vehicle, detecting the state of the preceding vehicle, and observing and recognizing a situation around the vehicle for recognition of a situation of a road on which the vehicle is traveling (road surface marks such as road ends, road white lines, yellow lines, etc., traffic signs such as indications of statutory speeds and overtaking prohibited section, presence/absence or a state of a further-preceding vehicle or other vehicles or obstacles around the vehicle, and the like), a front camera 70, a front millimeter-wave radar device 72, a rear camera 76, rear side millimeter-wave radar devices 78l, 78r (for blind spot monitors), side cameras or side radar devices 80l, 80r, and the like, and further includes a global positioning system (GPS) device (car navigation system) 74 that communicates with GPS artificial satellites to acquire various information such as a situation around the vehicle, a position information of the vehicle, and the like.

The driving support control device of the present embodiment executes "adaptive cruise control (ACC)" as driving support, which will be described in more detail later. In the ACC, control having the following configuration is executed. That is, constant speed traveling control is basically executed that automatically controls the vehicle speed to a value set by the driver, rather than based on the operation of the accelerator pedal, and when there is a preceding vehicle, in particular, distance control or follow-up control for following the preceding vehicle while detecting the preceding vehicle with a detection unit such as a radar or a camera and securing an appropriate distance from the preceding vehicle is executed. Therefore, in the control, the drive device 20 and the brake device operate to increase, decrease, or hold the vehicle speed of the vehicle under the control of an electronic control device 50 (computer).

The electronic control device 50 may include a computer and a drive circuit of a normal type having a central processing unit (CPU), a read only memory (ROM), a random access memory (RAM), and an input/output port device that are connected to each other by a bidirectional common bus. The configuration and the operation of each component of the driving support control device of the present embodiment, which will be described later, may be realized by the operation of the electronic control device 50 according to a program. The electronic control device 50 receives inputs of detection values from various sensors which are used for parameters for the driving support control of the present embodiment executed in the modes described later. The detection values include detection signals from the on-board cameras or radar devices 70, 72, 76, 78r, 78l, 80r, 80l, information from the GPS device 74 etc., a vehicle wheel speed Vwi (i=FL, FR, RL, RR), an operation amount or depression amount θa of the accelerator pedal 14, a steering angle δ of the steering wheel 32, a depression amount of the brake pedal, and the like. The electronic control device 50 outputs, to a corresponding device, a control command Cd for the drive device 20 for generating a driving force for accelerating the vehicle or a control command for the brake device for generating a braking force for decelerating the vehicle. Further, a vehicle speed setting switch 15 for receiving an instruction to execute the ACC from the driver is attached to the steering wheel 32, and a signal from the vehicle speed setting switch 15 is input to the electronic control device 50. The vehicle speed setting switch 15 may be turned on when the vehicle speed reaches a value at which the driver desires to perform the constant speed traveling with the ACC, so that the vehicle speed at that time becomes a set vehicle speed and the execution of the ACC is started. Further, although not shown, various parameters necessary for various controls that are executed in the vehicle of the present embodiment, for example, various detection signals such as a front-rear acceleration, a yaw rate, a lateral acceleration, etc. are input and various control commands may be output to the corresponding device.

Configuration of Device

Figure 1B:
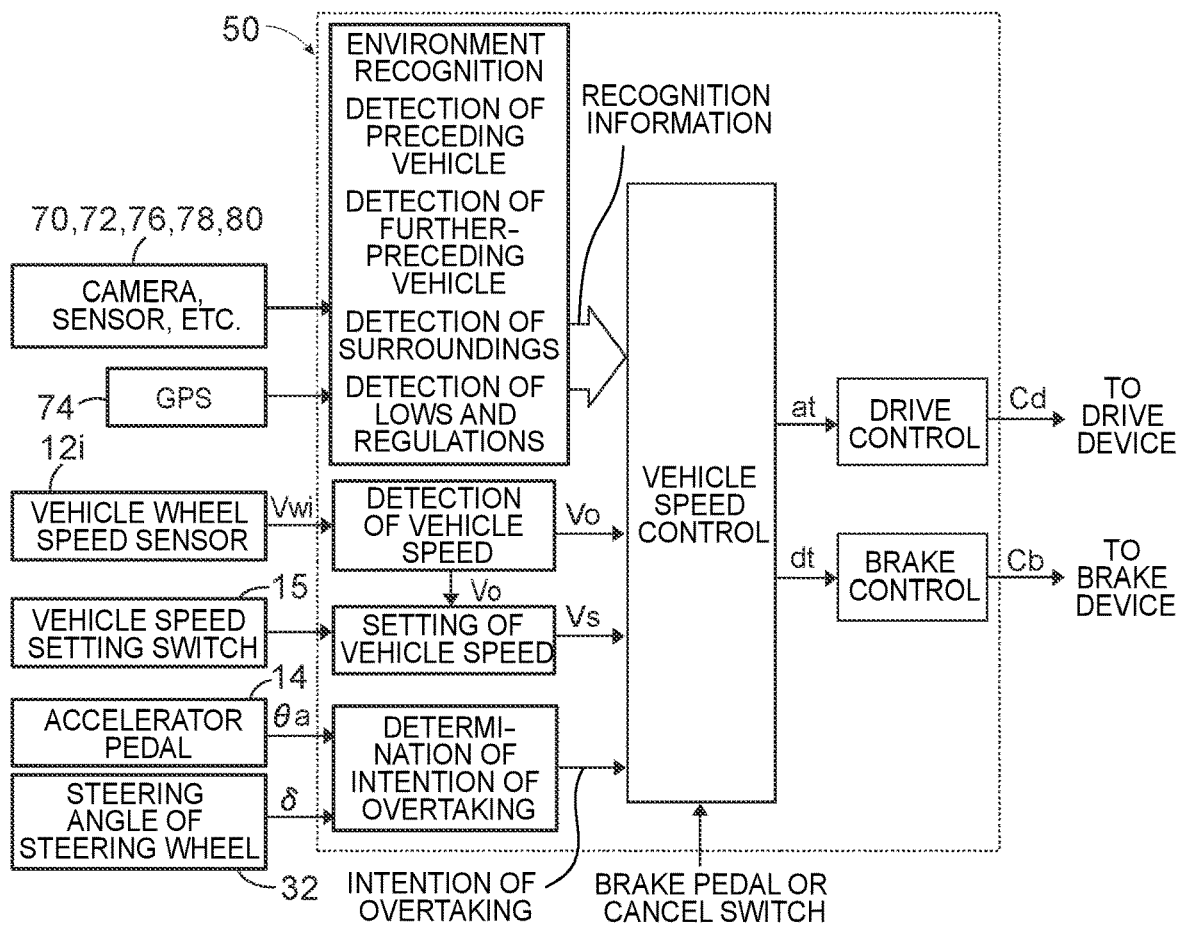
FIG. 1B is a diagram showing, in the form of a block diagram, a configuration of a system in one of the preferred modes of the driving support control device for a vehicle according to the present embodiment.

With reference to FIG. 1B, in the driving support control device according to the present embodiment, an environment recognition unit, a vehicle speed detection unit, a vehicle speed setting unit, an overtaking intention determination unit, a vehicle speed control unit, a drive control unit, and brake control unit may be provided in general.

The environment recognition unit receives the respective detection signals from the on-board cameras and/or the radar devices 70, 72, 76, 78r, 78l, 80r, 80l, or the position information of the vehicle from the GPS device 74 or the like, recognizes, using the information, the situation around the vehicle, that is, a preceding vehicle or other objects, the road white lines or the yellow lines, etc. in any manner, further detects the presence/absence, the positions, and the states of the preceding vehicle, the further-preceding vehicle, and other vehicles and obstacles around the vehicle, and further determines the traffic rules such as the statutory speed of the road on which the vehicle is traveling or whether the section of the road is the overtaking prohibited section.

Figure 2A:
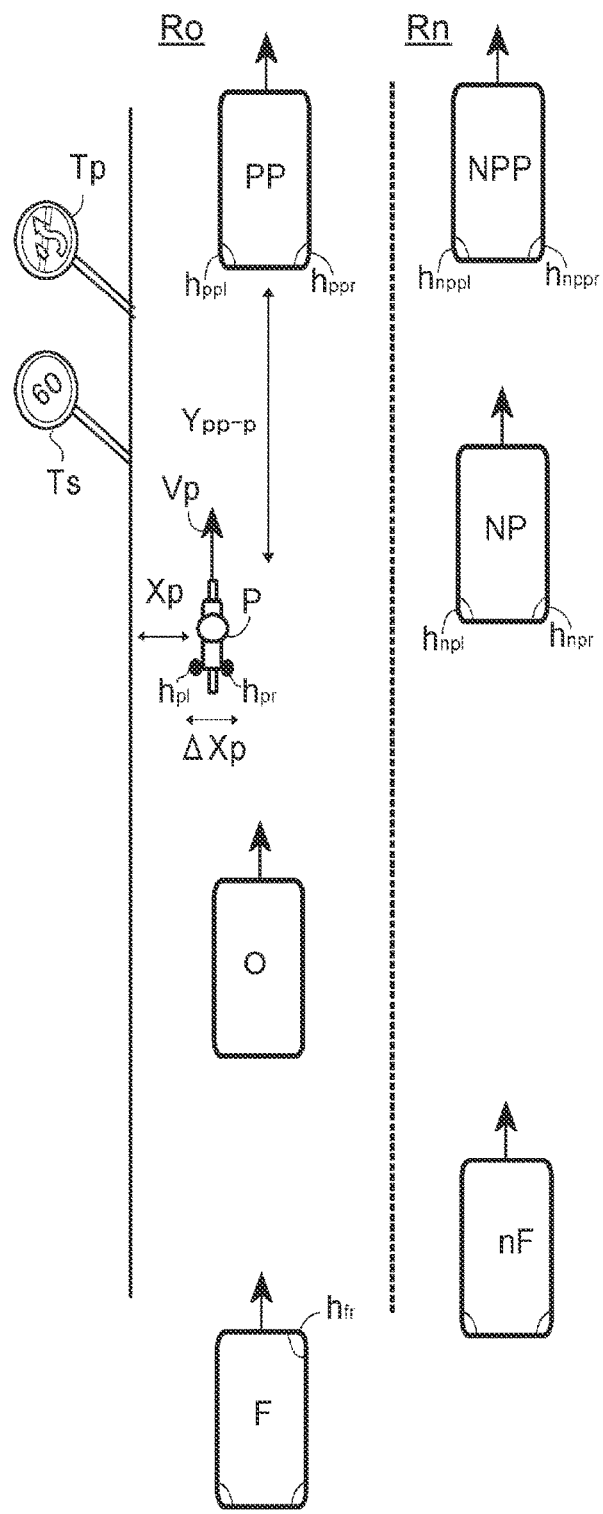
FIG. 2A is a schematic view of a state in which a vehicle speed is controlled such that the vehicle (own vehicle) follows a two-wheeled vehicle on the road, and is a diagram illustrating items referred to as conditions that allow overtaking of the two-wheeled vehicle, showing a case of a road with two or more lanes on each side.
Figure 2B:
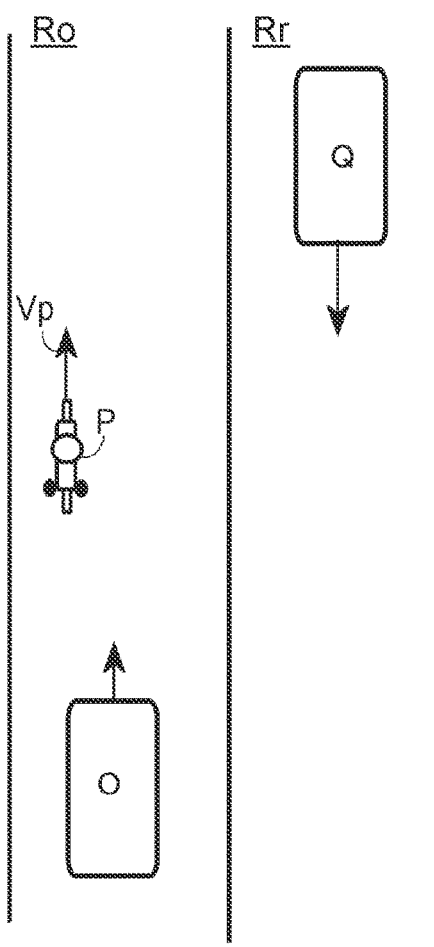
FIG. 2B is a schematic view of a state in which a vehicle speed is controlled such that the vehicle (own vehicle) follows a two-wheeled vehicle on the road, and is a diagram illustrating items referred to as conditions that allow overtaking of the two-wheeled vehicle, showing a case of a road with one lane on each side.

More specifically, first, with the detection signal of the camera 70 or the radar device 72 at the front of the vehicle, images of the road white lines or yellow lines, the road ends, the vehicle, other objects, the traffic signs and the like in front of the vehicle (own vehicle O) may be recognized, and the following may be specified (see FIGS. 2A and 2B).

Positions and ranges of a vehicle traveling lane (Ro), an adjacent lane (Rn), and an oncoming lane (Rr)

Presence/absence of a preceding vehicle (P) or a further-preceding vehicle (PP) traveling on the traveling lane Type of the preceding vehicle (two-wheeled vehicle or four-wheeled vehicle)

Traveling speed (Vp) of the preceding vehicle or the further-preceding vehicle

Lateral position (Xp) of the preceding vehicle from the lane end

States of turn signal lamps and tail lamps ($h_{pl}$, $h_{pr}$, $h_{ppl}$, $h_{ppr}$) of the preceding vehicle or the further-preceding vehicle Distance between the preceding vehicle and the further-preceding vehicle ($Y_{pp-p}$)

Presence/absence of a preceding vehicle (adjacent preceding vehicle NP) or a further-preceding vehicle (adjacent further-preceding vehicle NPP) traveling on the adjacent lane in the case of two lanes on each side States of turn signal lamps and tail lamps ($h_{npl}$, $h_{npr}$, $h_{nppl}$, $h_{nppr}$) of the adjacent preceding vehicle or the adjacent further-preceding vehicle Presence/absence of an oncoming vehicle (Q) traveling on the oncoming lane in the case of one lane on each side Presence/absence of obstacles between the traveling lane and the adjacent lane or the oncoming lane Whether the section of the road is an overtaking prohibited section (Tp)

Statutory speed (Ts)

Whether the section is an overtaking prohibited section and the statutory speed may be detected by matching the position information of the vehicle and the map information by the GPS device.

In addition, with the detection signals of the camera 76, the radar devices 78r, 78l at the rear of the vehicle (own vehicle O) and the side cameras or the radar devices 80l, 80r, images of the road white lines or yellow lines rearward or on the side of the vehicle, the road ends, vehicles, other objects, etc. may be recognized, and the following may be identified.

Presence/absence of a following vehicle (F) traveling on the traveling lane

State of a turn signal lamp ($h_f$) of the following vehicle

Presence/absence of a following vehicle traveling behind the vehicle on the adjacent lane on the right side (adjacent following vehicle nF)

The vehicle speed detection unit is configured to determine the vehicle speed Vo by any algorithm using the wheel speed Vwi detected by the wheel speed sensors of the wheels, the information of the GPS device, and the like. The vehicle speed setting unit sets the set vehicle speed Vs to be maintained in the constant speed traveling control by the ACC. The set vehicle speed may be set in any mode. For example, the set vehicle speed may be set to the vehicle speed Vo when the vehicle speed setting switch 15 is operated by the driver (the set vehicle speed may be changed based on a button operation by the driver after being set). The overtaking intention determination unit refers to the depression of the accelerator pedal or the steering operation of the steering wheel by the driver during the execution of the ACC, and determines that the driver has an intention of overtaking when an operation is performed with which it is determined that the driver has an intention of overtaking the preceding vehicle as described later.

When the vehicle speed setting switch 15 is operated by the driver, the vehicle speed control unit refers to the set vehicle speed Vs and the vehicle speed Vo, determines the acceleration at or the deceleration dt, and transmits the acceleration at or the deceleration dt to the drive control unit or the brake control unit, such that the vehicle speed Vo is held at the set vehicle speed Vs as the constant speed traveling control by the ACC. In addition, the vehicle speed control unit refers to the information on the presence/absence of the preceding vehicle from the environment recognition unit, and when the preceding vehicle is detected, determines the acceleration at or the deceleration dt and transmits the acceleration at or the deceleration dt to the drive control unit or the brake control unit such that, as the follow-up control or the distance control by the ACC, the vehicle speed is adjusted so that the vehicle follows the preceding vehicle while appropriately maintaining the distance from the preceding vehicle. Thus, the drive control unit and the brake control unit operate the drive device 20 or the brake device, respectively, so as to achieve the acceleration at or the deceleration dt, whereby the vehicle speed Vo is maintained at the set vehicle speed Vs or adjusted so that the vehicle follows the preceding vehicle without the operation of the accelerator pedal or the brake pedal by the driver. In the device of the present embodiment, as described later, in a state where the control for following the preceding vehicle is executed, when it is determined that the preceding vehicle is a two-wheeled vehicle and conditions that allow the vehicle to overtake the two-wheeled vehicle are satisfied based on the recognition information from the environment recognition unit and it is determined that the driver has an intention of overtaking based on the information from the overtaking intention determination unit, the vehicle speed control unit ends the control for following the preceding vehicle that is a two-wheeled vehicle, and executes a process of controlling the vehicle speed such that the vehicle can overtake the two-wheeled vehicle. Thus, overtaking the two-wheeled vehicle that is the preceding vehicle can be realized simply by the appropriate steering of the steering wheel by the driver.

Brake pedal depression information or the state of a cancel switch may also be input to the vehicle speed control unit. When the depression of the brake pedal or the operation of the cancel switch is detected during the execution of the ACC, the execution of the ACC may be canceled.

Operation of Device (1) Overtaking of Two-Wheeled Vehicles During ACC Operation

In the operation of the ACC, basically, when the preceding vehicle is not detected, the vehicle speed is controlled so as to match the set vehicle speed, and when the preceding vehicle is detected, the ACC is executed to control the vehicle speed such that the vehicle follows the preceding vehicle. While the ACC is in operation, when the preceding vehicle is a two-wheeled vehicle and the driver has an intention of overtaking the two-wheeled vehicle, it is necessary, in the related art, to continue depressing the accelerator pedal while steering the steering wheel until the vehicle overtakes the two-wheeled vehicle, to override the control for following the preceding vehicle. Thus, in the present embodiment, as the driving support for reducing the series of operations by the driver, when the condition is satisfied that the vehicle can safely overtake the two-wheeled vehicle during the execution of the control for following the two-wheeled vehicle serving as the preceding vehicle and the driver indicates the intention of overtaking the two-wheeled vehicle, the control for following the preceding vehicle is ended, and the vehicle speed is controlled such that the vehicle can overtake the two-wheeled vehicle. The vehicle speed control may be a control that increases the vehicle speed such that the vehicle speed matches the set vehicle speed. According to such a configuration, when the vehicle following the two-wheeled vehicle overtakes the two-wheeled vehicle, the driver only needs to steer the steering wheel, so that the operational burden on the driver can be reduced.

(2) Conditions that Allow Overtaking of Two-Wheeled Vehicle

In the present embodiment, as described above, when the overtaking of the two-wheeled vehicle is performed through the vehicle speed control by the ACC, it is confirmed, before the execution of the vehicle speed control, that the vehicle can safely overtake the two-wheeled vehicle, by referring to the information obtained by the environment recognition unit described above. Specifically, it may be confirmed that the following conditions are satisfied as the conditions that allow overtaking of a two-wheeled vehicle. The following description is given in the case of left hand traffic. In the case of right hand traffic, the left and the right are reversed in the following description.

(a) The Section of the Road is not the Overtaking Prohibited Section

In the case of the overtaking prohibited section (when a sign Tp is installed, when a lane boundary is defined by a yellow line, etc.), overtaking a two-wheeled vehicle cannot be performed. Therefore, it is confirmed that the section is not an overtaking prohibited section.

(b) The Vehicle can Travel on the Side of the Two-Wheeled Vehicle without Possibility of Contact With reference to FIG. 2A, for overtaking the two-wheeled vehicle P, it is preferable to confirm that a situation is established in which the vehicle O can travel on the side of the two-wheeled vehicle P without contacting the two-wheeled vehicle P. Specifically, for example, it may be confirmed that all the following conditions are satisfied.

(i) A distance Xp between the lateral position of the two-wheeled vehicle P and the left end of the traveling lane is shorter than the width of the predetermined ratio k of the lane width $X_R$. That is, $Xp < k \cdot X_R$ (or the distance from the right end of the traveling lane $(X_R - Xp)$ is longer than the width of the predetermined ratio k of the lane width $X_R$).

: Because a sufficient space is necessary for the vehicle O to pass by the side of the two-wheeled vehicle P. The predetermined ratio k may be appropriately set by calibration.

(ii) A fluctuation range $\Delta Xp$ of the lateral position of the two-wheeled vehicle P within a predetermined time $\Delta t$ is smaller than a predetermined range H. That is, $\Delta Xp < H$ : If the fluctuation range $\Delta Xp$ is large and the two-wheeled vehicle P staggers, there is high possibility that the two-wheeled vehicle P may come into contact with the vehicle O while the vehicle O is passing by the side of the two-wheeled vehicle. The time Δt and the predetermined range H may be appropriately set by calibration.

(iii) The right turn signal lamp $h_{pr}$ of the two-wheeled vehicle P is not lit.

Because when the right turn signal lamp of the two-wheeled vehicle P is lit, there is a possibility that the two-wheeled vehicle P moves toward the right side in an attempt to overtake the further-preceding vehicle so that a sufficient space cannot be secured for the vehicle O to pass by the side of the two-wheeled vehicle P.

(iv) The hazard warning lamps $h_{pr}$, $h_{rl}$ of the two-wheeled vehicle P are not lit.

: Because when the hazard warning lamps $h_{pr}$, $h_{rl}$ of the two-wheeled vehicle P are lit, the subsequent behavior of the two-wheeled vehicle P is unpredictable.

(v) The left turn signal lamp $h_{ppl}$ is not lit when the further-preceding vehicle PP is detected.

: Because when the left turn signal lamp $h_{ppl}$ of the further-preceding vehicle PP is lit, there is a possibility that the two-wheeled vehicle P overtakes the further-preceding vehicle PP, and in that case, the two-wheeled vehicle P may move toward the right side in an attempt to overtake the further-preceding vehicle PP so that a sufficient space cannot be secured for the vehicle O to pass by the side of the two-wheeled vehicle P.

(c) There is no possibility of contacting the further-preceding vehicle after overtaking of the two-wheeled vehicle With reference to FIG. 2A, when the further-preceding vehicle PP is detected, it is preferable to confirm that the vehicle O has no possibility of contacting the further-preceding vehicle PP after overtaking the two-wheeled vehicle P. Specifically, for example, it may be confirmed that all the following conditions are satisfied.

(i) The distance $Y_{pp-p}$ between the two-wheeled vehicle P and the further-preceding vehicle PP is equal to or larger than a predetermined distance Yth. That is, $Y_{pp-p}$>Yth : Because a space is necessary for the vehicle O to return to the traveling lane Ro after overtaking the two-wheeled vehicle. The predetermined distance Yth may be appropriately set by calibration.

(ii) The right turn signal lamp $h_{pp}$r of the further-preceding vehicle PP is not lit.

: In order to restrain the vehicle O from coming into contact with the further-preceding vehicle PP that has moved toward the right side while overtaking two-wheeled vehicle P.

(iii) The tail lamps (brake lamps) of the further-preceding vehicle PP are not lit.

: Because when the further-preceding vehicle PP is braked and decelerated, there is a possibility that a sufficient space cannot be secured for the vehicle O to return to the traveling lane Ro after overtaking the two-wheeled vehicle P.

(d) There are no other vehicles or obstacles with possibility of contact on the side or rearward With reference to FIGS. 2A and 2B, it is preferable to confirm that there are no other vehicles or obstacles that may contact the vehicle O while the vehicle O is overtaking the two-wheeled vehicle P. Specifically, for example, it may be confirmed that all the following conditions are satisfied.

(i) The right turn signal lamp $h_{fr}$ is not lit when the following vehicle F is detected.

: In order to restrain the vehicle O from coming into contact with the following vehicle F while overtaking the two-wheeled vehicle P, because when the right turn signal lamp $h_{fr}$ of the following vehicle F is lit, there is a possibility that the following vehicle F may overtake the vehicle O.

(ii) The left turn signal lamp $h_{npl}$ or $h_{nppl}$ is not lit when the adjacent preceding vehicle NP or the adjacent further-preceding vehicle NPP is detected.

: In order to restrain the vehicle O from coming into contact with the adjacent preceding vehicle NP or the adjacent further-preceding vehicle NPP while overtaking the two-wheeled vehicle P, because when the left turn signal lamp $h_{npl}$, $h_{nppl}$ of the adjacent preceding vehicle NP or the adjacent further-preceding vehicle NPP is lit, there is a possibility that the adjacent preceding vehicle NP or the adjacent further-preceding vehicle NPP enters the traveling lane Ro of the vehicle (own vehicle O).

(iii) The oncoming vehicle Q is not detected on the oncoming lane Rr in the case of a two-way road with one lane on each side.

: In order to restrain the vehicle O from coming into contact with the oncoming vehicle Q when a part of the vehicle O enters the oncoming lane Rr while the vehicle O is overtaking the two-wheeled vehicle P.

(iv) The adjacent following vehicle nF is not be detected by the blind spot monitor in the right adjacent lane Rn in the case of a road with two lanes on each side.

: In order to restrain the vehicle O from coming into contact with the following vehicle nF in the right adjacent lane Rn while overtaking the two-wheeled vehicle P.

(v) No obstacle is detected between the vehicle and the adjacent lane.

: In order to restrain the vehicle O from coming into contact with obstacles (not shown) while overtaking two-wheeled vehicle P.

(e) Speed Condition

When a vehicle overtakes a two-wheeled vehicle, the vehicle speed of the vehicle is increased to a set vehicle speed equal to or lower than the statutory speed. Therefore, it is preferable that the traveling speed of the two-wheeled vehicle that is the preceding vehicle be a value at which the vehicle can overtake the two-wheeled vehicle within an appropriate time at a vehicle speed up to the set vehicle speed. Thus, regarding the traveling speed of the two-wheeled vehicle, it is preferable to confirm that the difference from the statutory speed and the difference from the set vehicle speed are each equal to or higher than a predetermined value. That is, the conditions may be that the following conditions are satisfied.

$$\text{Statutory speed–two-wheeled vehicle speed} \geq \Delta Vr \qquad (1a)$$

$$\text{Set speed–two-wheeled vehicle speed} \geq \Delta Vs \qquad (1b)$$

Here, ΔVr and ΔVs are predetermined values, and may be set by calibration so as to be the speed differences that allow overtaking of the two-wheeled vehicle within an appropriate time when the vehicle speed of the vehicle is the set speed. Since the statutory speed is normally equal to or higher than the set speed, only the condition (1b) may be confirmed.

Thus, when the above conditions (a) to (e) are confirmed, it may be determined that the conditions that allow overtaking of the two-wheeled vehicle are satisfied. The above conditions are examples of the preferable conditions that should be satisfied as the conditions that allow overtaking of the two-wheeled vehicle. Other conditions may be confirmed, or confirmation of some of the conditions may be omitted (if it is difficult to overtake the two-wheeled vehicle regardless of the determination of the conditions, the overtaking process by the ACC can be stopped with the depression of the brake pedal by the driver or the like). It should be understood that all the above cases fall within the scope of the present embodiment.

(3) Detection of Driver's Intention of Overtaking Two-Wheeled Vehicle

As described above, the overtaking process for the two-wheeled vehicle in the present embodiment is executed when the overtaking intention determination unit detects the driver's intention. Specifically, when any of the following operations is detected with which it is determined that the driver has an intention of overtaking the preceding vehicle, it may be determined that the driver has an intention of overtaking the two-wheeled vehicle.
(a) Acceleration operation such as depression of the accelerator pedal by the driver has continued beyond a predetermined time Ta1.
(b) Acceleration operation such as a state in which the amount of depression of the accelerator pedal by the driver exceeds a predetermined threshold value has continued beyond a predetermined time Ta2 (<Ta1).
(c) The driver steers the steering wheel in a direction (right direction) of overtaking the two-wheeled vehicle upon the acceleration operation such as depression of the accelerator pedal.
The predetermined time Ta1, Ta2, and the predetermined threshold value may be determined as appropriate by calibration. It may be determined that the driver has an intention of overtaking the two-wheeled vehicle when a state other than the above examples is detected (for example, input of an overtaking request switch). It should be understood that even that case falls within the scope of the present embodiment.

(4) Process Procedure of Device

Figure 3:
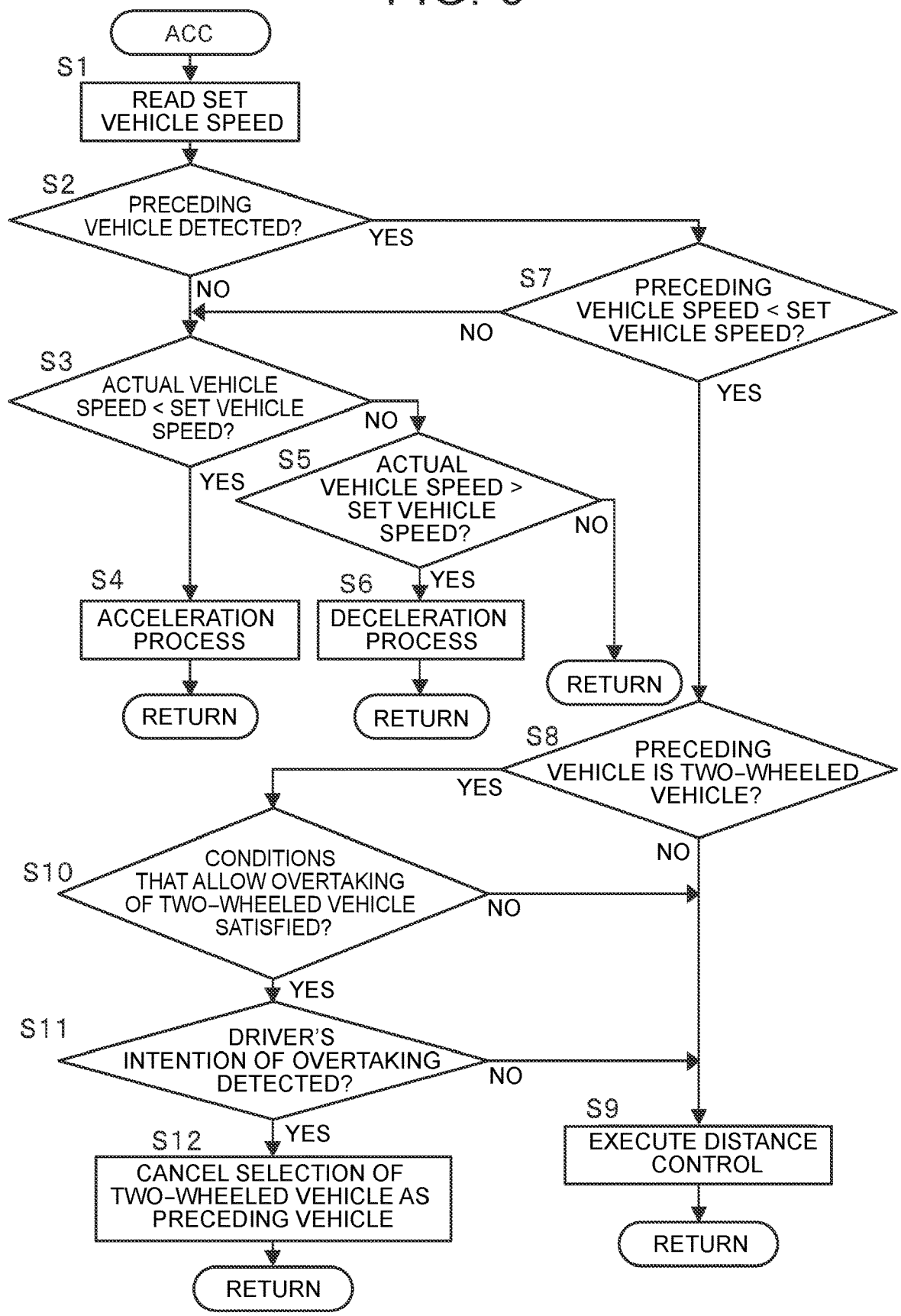
FIG. 3 is a diagram showing, in the form of flowchart, operation when adaptive cruise control (ACC) is executed in the driving support control device for a vehicle according to the present embodiment.

As described above, regarding the ACC in the driving support control device of the present embodiment, for example, when the actual vehicle speed reaches a value at which the driver desires to execute the constant speed traveling control with the ACC and the driver turns on the vehicle speed setting switch 15, execution of the ACC is started, with the vehicle speed at that time set as the set vehicle speed. With reference to FIG. 3, a specific process procedure after the execution of the ACC is started may be as follows.

In the process, first, the set vehicle speed is read (step 1), and it is determined whether the preceding vehicle is detected (step 2). The detection of the preceding vehicle may be executed by any algorithm. For example, when an image of a vehicle (another vehicle) is detected in the traveling lane of the vehicle (own vehicle) defined by the environment recognition unit, an index value (may be referred to as "own traveling lane probability reliability") may be calculated that increases as the lateral position of the vehicle (other vehicle) becomes closer to the center position of the traveling path of the vehicle (own vehicle) and the distance between the vehicle (other vehicle) and the vehicle (own vehicle) becomes shorter, and when the index value exceeds a predetermined value, the vehicle (other vehicle) may be selected as a preceding vehicle and detected. When the preceding vehicle is not detected, the control of the actual vehicle speed to the set vehicle speed (constant speed traveling control) is executed. Specifically, when the actual vehicle speed is lower than the set vehicle speed (step 3), the acceleration process is executed (step 4), in which the acceleration is instructed to the drive control unit and further, the control command Cd is sent from the drive control unit to the drive device, thereby accelerating the vehicle. When the actual vehicle speed is higher than the set vehicle speed (step 5), the deceleration process is executed (step 6), in which the deceleration is instructed to the brake control unit and further, the control command Cb is sent from the brake control unit to the brake device, thereby decelerating the vehicle.

When the preceding vehicle is detected while the control of the actual vehicle speed to the set vehicle speed is being executed as described above (step 2), the vehicle speed of the preceding vehicle is referred to, and it is determined whether the vehicle speed of the preceding vehicle is lower than the set vehicle speed (step 7). Here, when the vehicle speed of the preceding vehicle is not lower than the set vehicle speed, the control of the actual vehicle speed to the set vehicle speed is continued as it is. On the other hand, when the vehicle speed of the preceding vehicle is lower than the set vehicle speed, basically, the distance control or the preceding vehicle follow-up control is executed that controls the vehicle speed so as to follow the preceding vehicle while securing an appropriate distance from the preceding vehicle (step 9). The distance control may be executed in the same manner as in the normal mode of the ACC, in which the vehicle speed of the vehicle is adjusted such that an appropriate distance from the preceding vehicle is secured and the vehicle speed of the vehicle matches the vehicle speed of the preceding vehicle. When the preceding vehicle is no longer detected in the repetition of the process cycles, the constant speed traveling control of steps 3 to 6 is executed.

However, in the device of the present embodiment, the following process is executed. That is, as shown in the drawings, when the vehicle speed of the preceding vehicle is lower than the set vehicle speed, it is determined whether the preceding vehicle is a two-wheeled vehicle (step 8) prior to the execution of the distance control or the preceding vehicle follow-up control, and when the preceding vehicle is a two-wheeled vehicle, it is determined whether to execute the overtaking process for the two-wheeled vehicle.

Figure 4:
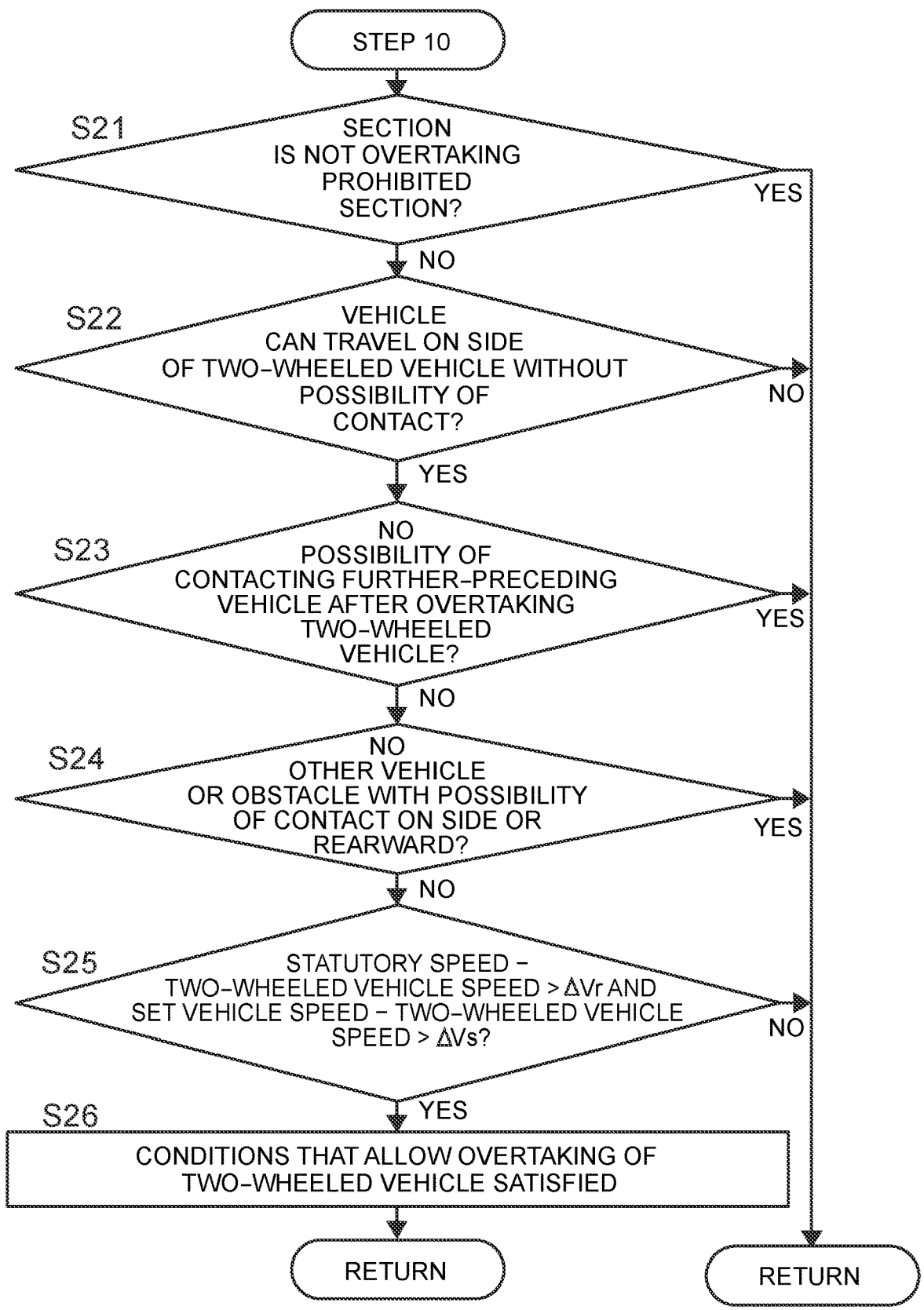
FIG. 4 is a diagram showing, in the form of a flowchart, a process of determining whether the conditions that allow overtaking of the two-wheeled vehicle is satisfied in step 10 of the flowchart of FIG. 3.

Specifically, when it is determined that the preceding vehicle is a two-wheeled vehicle (step 8), it is first determined whether the conditions that allow overtaking of the two-wheeled vehicle are satisfied (step 10). More specifically, in step 10, as described above with reference to FIG. 4, all the following are confirmed: the section is not an overtaking prohibited section (step 21); the vehicle can travel on the side of the two-wheeled vehicle without the possibility of contact (step 22); there is no possibility of contacting the further-preceding vehicle after overtaking the two-wheeled vehicle (step 23); and there are no other vehicles or obstacles with possibility of contact on the side or rearward (step 24). When the above speed conditions (step 25) are satisfied, it is determined that the conditions that allow overtaking of the two-wheeled vehicle are satisfied (step 26). Here, when any one of the determination conditions in steps 21 to 26 is not satisfied and it is not determined that the conditions that allow overtaking of the two-wheeled vehicle are satisfied, the distance control or the preceding vehicle follow-up control that controls the vehicle speed so as to follow the preceding vehicle is executed or continued (step 9).

On the other hand, when it is determined that the conditions that allow overtaking of the two-wheeled vehicle are satisfied (step 10), it is determined whether the driver's intention of overtaking the two-wheeled vehicle is detected (step 11). Here, when the operation indicating the driver's intention of overtaking the two-wheeled vehicle is not detected as described above, the distance control or the preceding vehicle follow-up control that controls the vehicle speed so as to follow the preceding vehicle is executed or continued as described above (step 9).

When the operation indicating the driver's intention of overtaking the two-wheeled vehicle is detected (step 11), the overtaking process for the two-wheeled vehicle by the ACC is executed. Specifically, first, the selection of the two-wheeled vehicle as the preceding vehicle is canceled (step 12). That is, the process is executed in which the two-wheeled vehicle that has been detected as the preceding vehicle is not selected as the preceding vehicle. After that, the process may be executed assuming that the preceding vehicle is not detected in step 2 in the process cycle of FIG. 3, and the constant speed traveling control of steps 3 to 6 may be executed. Then, immediately after the selection of the two-wheeled vehicle as the preceding vehicle is canceled, the vehicle is traveling following the two-wheeled vehicle, and the vehicle speed of the vehicle is lower than the set vehicle speed. Therefore, the acceleration process is executed in steps 3 and 4. At the same time, when the driver steers the steering wheel in order to overtake the two-wheeled vehicle, the vehicle automatically passes by the side of the two-wheeled vehicle and overtakes the two-wheeled vehicle. When the driver steers the steering wheel to return the vehicle to the original traveling lane at this stage, the vehicle returns to the traveling lane and the overtaking of the two-wheeled vehicle is achieved. In addition, the acceleration of the vehicle during the execution of overtaking of the two-wheeled vehicle by the vehicle (from the start of overtaking of the two-wheeled vehicle to the completion of overtaking of the two-wheeled vehicle (the completion of overtaking of the two-wheeled vehicle may be confirmed by the side or rear camera or the side or rear radar device, etc.) may be adjusted to a value different from that in the case of normal constant speed traveling control. Further, the detection process of the preceding vehicle may not be executed until the overtaking of the two-wheeled vehicle is completed. Further, when another preceding vehicle is detected after overtaking of the two-wheeled vehicle, that is, when the further-preceding vehicle before overtaking is newly detected as the preceding vehicle, the process of step 7 and thereafter may be executed for the newly detected preceding vehicle.

The above series of processes by the ACC may be ended by an override operation by the driver, for example, depression of the brake pedal or operation of the cancel switch.

Thus, as described above, the driver may indicate the intention of overtaking when the distance control or the follow-up control to follow the two-wheeled vehicle serving as the preceding vehicle is being executed and the conditions that allow overtaking of the two-wheeled vehicle are satisfied. In this case, the vehicle speed is automatically controlled such that the vehicle overtakes the two-wheeled vehicle. According to the above configuration, when the control for following the two-wheeled vehicle is being executed by the ACC and the traveling speed of the two-wheeled vehicle is slow, the vehicle can overtake the two-wheeled vehicle without the continuous operation of the accelerator pedal by the driver while securing safe traveling. This makes it possible to provide suitable driving support that reduces the operational burden on the driver. In the device of the present embodiment, the control is configured such that, by determining whether the preceding vehicle is a two-wheeled vehicle, the process of overtaking can be executed only in the case of the two-wheeled vehicle. Thus, the device of the present embodiment is suitably configured such that an unnecessary overtaking process is not executed when the preceding vehicle is a four-wheeled vehicle that is considered to be overtaken less frequently.

Although the above description has been made in connection with the embodiment of the present disclosure, many modifications and alterations can be easily made by those skilled in the art. Thus, it is clear that the present disclosure is not limited to the embodiment exemplified above and can be applied to various devices without departing from the scope of the present disclosure.

What is claimed is:

1. A driving support control device for a vehicle having four wheels, the driving support control device comprising:
    a preceding vehicle detection unit that detects a preceding vehicle in a path of the vehicle, the preceding vehicle detection unit being configured to determine whether the preceding vehicle is a four-wheeled vehicle or a two-wheeled vehicle; and
    a vehicle speed control unit configured to:
        when the preceding vehicle is not detected, control a vehicle speed of the vehicle such that the vehicle speed matches a set vehicle speed;
        when the preceding vehicle is detected and a vehicle speed of the preceding vehicle exceeds the set vehicle speed, control the vehicle speed of the vehicle such that the vehicle speed matches the set vehicle speed; and
        when the preceding vehicle is detected to be the two-wheeled vehicle and the vehicle speed of the preceding vehicle is lower than the set vehicle speed:
            determine whether conditions that allow the vehicle to overtake the preceding vehicle;
            determine whether an intention of a driver to overtake the preceding vehicle is detected; and
            cancel selection of the two-wheeled vehicle as the preceding vehicle and control the vehicle speed of the vehicle such that the vehicle speed matches the set vehicle speed, based on a determination that the conditions that allow the vehicle to overtake the preceding vehicle are satisfied and the intention of the driver to overtake the preceding vehicle is detected.

2. The driving support control device according to claim 1, wherein the conditions that allow the vehicle to overtake the preceding vehicle comprise that the two-wheeled vehicle is determined to be able to travel on a side of the two-wheeled vehicle without a possibility of contacting the two-wheeled vehicle.

3. The driving support control device according to claim 1, wherein the conditions that allow the vehicle to overtake the preceding vehicle comprise that the vehicle speed of the two-wheeled vehicle is a speed at which the vehicle is able to overtake the two-wheeled vehicle at a vehicle speed equal to or lower than the set vehicle speed.

4. The driving support control device according to claim 1, wherein the conditions that allow the vehicle to overtake the preceding vehicle comprise that there is no other vehicle or obstacle having a possibility of contacting the vehicle while the vehicle is traveling on a side of the two-wheeled vehicle.

5. The driving support control device according to claim 1, further comprising a further-preceding vehicle detection unit that detects a further-preceding vehicle on the path of the vehicle, wherein the conditions that allow the vehicle to overtake the preceding vehicle comprise that the vehicle is determined to have no possibility of contacting the further-preceding vehicle after overtaking the two-wheeled vehicle.

6. The driving support control device according to claim 1, wherein the driving support control device is configured to detect that the driver has the intention of overtaking the two-wheeled vehicle when the driver performs a predetermined operation on an accelerator pedal or a steering wheel while the vehicle speed control unit is controlling the vehicle speed of the vehicle such that the vehicle follows the two-wheeled vehicle.

7. The driving support control device according to claim 1, wherein the vehicle speed control unit is configured to control the vehicle speed of the vehicle to the set vehicle speed when the conditions that allow the vehicle to overtake the preceding vehicle are satisfied and the intention of the driver to overtake the two-wheeled vehicle is detected while the vehicle speed control unit is controlling the vehicle speed of the vehicle such that the vehicle follows the two-wheeled vehicle.

* * * * *